United States Patent
Parker et al.

[15] 3,656,210
[45] Apr. 18, 1972

[54] CABLE END FITTING

[72] Inventors: Robert W. Parker, Brawley; Jacob H. McGary, El Centro, both of Calif.

[73] Assignee: The United States of America as represented by the Secretary of the Navy

[22] Filed: Sept. 25, 1970

[21] Appl. No.: 75,511

[52] U.S. Cl. .................... 24/123 A, 24/123 W, 24/265 CC
[51] Int. Cl. ........................................ F16g 11/02, A44c 5/18
[58] Field of Search ......... 24/115 A, 123 A, 265 CC, 265 EE, 24/265 A; 287/80, 81, 82; 244/149, 151

[56] References Cited

UNITED STATES PATENTS

| | | | |
|---|---|---|---|
| 2,181,794 | 11/1939 | Schlytter | 287/80 |
| 2,571,592 | 10/1951 | Lundstrom | 287/81 |
| 289,334 | 11/1883 | Brewer | 287/80 |
| 1,305,591 | 6/1919 | Dickson | 287/82 |
| 2,074,898 | 3/1937 | Fotsch | 287/82 |

FOREIGN PATENTS OR APPLICATIONS

| | | | |
|---|---|---|---|
| 251,723 | 8/1948 | Switzerland | 24/265 RC |
| 678,517 | 1/1964 | Canada | 24/265 RC |

*Primary Examiner*—Bernard A. Gelak
*Attorney*—R. S. Sciascia, George J. Rubens and J. W. McLaren

[57] ABSTRACT

A cable end fitting that is fabricated from a single blank of sheet metal and stamped with a recess to receive and retain an enlarged end of the cable, the blank being intermediately bent so that its free ends are in lapping relationship, and means provided for fastening the lapped free ends together to capture and to secure the cable end therebetween.

4 Claims, 3 Drawing Figures

PATENTED APR 18 1972 3,656,210

*INVENTOR.*
JACOB H. McGARY
BY ROBERT W. PARKER

ATTORNEYS

CABLE END FITTING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to connectors and more particularly to a fitting for anchoring a cable end. One particular use of the invention device is for adapting a lanyard to an automatic actuator in a personnel parachute. The arming cable has an enlarged swaged end which is anchored in a recess in the fitting.

The fittings presently in use for this purpose are fabricated in two separate parts which are threaded together. Such prior art devices are not only more costly to produce, but are heavier and longer than required, weight being a critical factor in parachute design.

The present invention fitting is preferably stamped in a single blank from sheet metal. Thereafter, the blank is bent intermediately to a folded position, and the free ends of the blank are secured together, with the cable anchored therebetween, by rivets or the like.

SUMMARY OF THE INVENTION

A cable end fitting fabricated of a single blank formed from sheet material. The fitting blank is preferably die stamped and pressed with a suitable recess to receive an enlarged cable end. The blank is then bent intermediate the ends into a flat U-shaped configuration with the two halves in lapping relation. The ends can be sprung-apart to receive the enlarged cable end, and thereafter the blank ends can be secured together by rivets or the like to form an integral, lightweight construction.

OBJECTS OF THE INVENTION

A principal object of this invention is to provide a cable end fitting that is simple, compact, lightweight and inexpensive to fabricate, if necessary, without requiring elaborate tooling.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
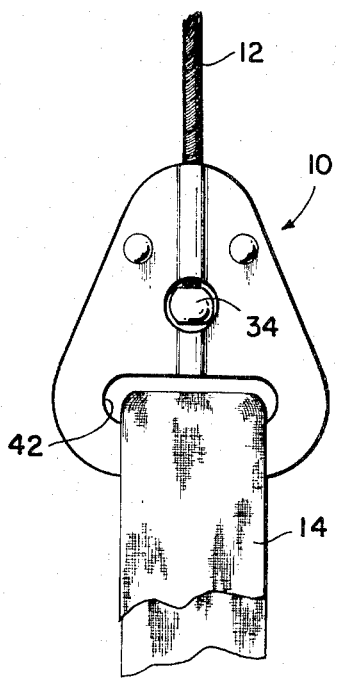
FIG. 1 is a plan view of the fitting shown attached to a cable end at one end and a lanyard strap at the other end.

Referring to the drawings where like reference numbers refer to similar parts throughout the figures, there is shown in FIG. 1 a fitting 10 fabricated according to the teaching of this invention shown connected to a cable 12 and a lanyard strap 14. Although the present embodiment is designed specifically for an automatic parachute actuator (not shown), it is obvious that the fitting can be adapted readily to other uses without departing from the spirit of the invention.

Figure 2:
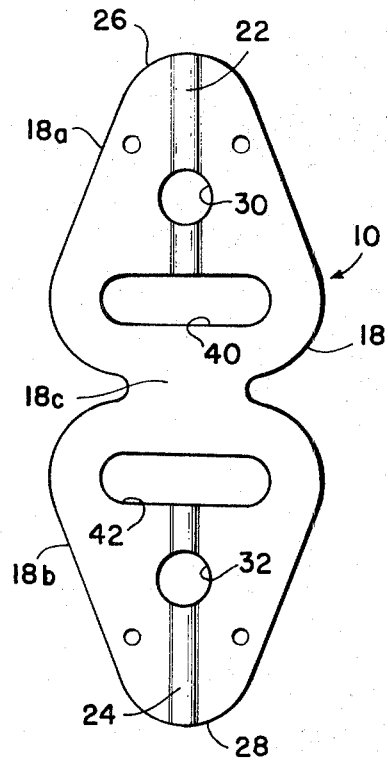
FIG. 2 is a plan view of the fitting blank after die stamping and prior to bending.

One important feature of the invention is the fabrication of fitting 10 from a single blank 18 (FIG. 2) from a sheet of metal or the like, preferably corrosion resistant sheet steel. Although fabrication by die stamping is preferred for production runs, the fitting can be made by hand which is desirable in emergencies for remote squadron repair facilities when the fitting is in short supply. Body blank 18 comprises two half-portions 18a and 18b, respectively, integrally connected by a reduced bend portion 18c.

Figure 3:
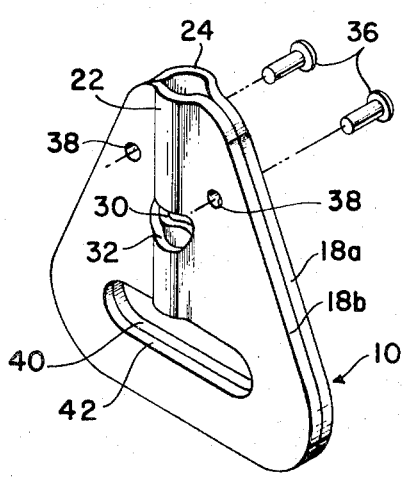
FIG. 3 is a perspective view of the assembled blank prior to insertion of both connecting elements.

While in blank form, and simultaneously in a die stamping operation when utilized, at least one, and preferably two longitudinal recesses or channels 22 and 24 are pressed in to the fitting body, one in each body half. The channels lead inwardly from the free ends 26 and 28 thereof and intersect recesses or transverse openings 30 and 32, respectively. Channels 22 and 24 are adapted to receive corresponding portions of cable 12 enabling the body halves 18a and 18b to be secured together in doubled-over relation as shown in FIGS. 1 and 3. If desired, only one longitudinal channel need be provided in one of the body halves to accommodate the cable, although such a construction would produce an off-center pull which may be undesirable in some applications.

Transverse openings 30 and 32 serve to receive the swaged ball end 34 of cable 12. The diameter of ball end 34 is greater than the combined diameter of channels 22 and 24 (as shown in FIG. 1) so that the channels provide a reinforced shoulder to restrain swaged end 34 therein.

Cable 12 and swaged end 34 are readily inserted into the folded over fitting body in FIG. 3 by forcing apart body halves 18a and 18b against the spring action of the parts. After insertion of cable 12 the body halves are secured together by a pair of rivets 36 extending transversely through corresponding holes 38 formed in the body halves during the die stamping operation.

Adjacent the bend portion 18c, a pair of oppositely disposed apertures 40 and 42 may be provided during the die stamping of the body blank to receive the strap 14 or any other type of connecting element.

The novel fitting of this invention provides a simplified fitting which is lighter in weight and less expensive to manufacture, both in production lots or hand fabricated where necessary in forward repair facilities.

Obviously many modifications and variations of the present invention are possible in the light of the above teachings. It is therefore to be understood that within the scope of the appended claims the invention may be practiced otherwise than as specifically described.

What is claimed is:

1. A fitting for attachment to an enlarged end of a cable comprising:
    a body member formed of a single blank of flat sheet material bent intermediately with the free ends of the two halves disposed contiguous in lapping relation;
    said body member having at an end adjacent the bend means for attaching a connecting element;
    said body having a longitudinal channel formed in at least one of the free ends of the halves to receive the cable and a recess to receive the enlarged cable end;
    said enlarged end being larger than the channelled portion of the body to be restrained thereby; and
    means for securing said free ends of the body halves together with the enlarged end of the cable captured therebetween.

2. The fitting of claim 1 wherein both of said body halves are provided with oppositely disposed channels intersecting the recess.

3. The fitting of claim 1 wherein said recess is oppositely disposed openings extending transversely through said body halves to receive said enlarged cable end, said openings having a similar configuration as the enlarged cable end.

4. A parachute fitting for attachment to an enlarged end of an arming cable comprising:
    a body member formed of a single blank of flat sheet metal bent intermediately with the free ends of the two halves disposed in contiguous lapping relation;
    said body member having at an end adjacent the bend an aperture extending therethrough to receive a lanyard strap;
    said body having longitudinal channels formed in both body halves to house the cable, and openings extending through both halves to receive the enlarged end of said cable;
    the dimensions of said enlarged cable end being larger than the combined dimensions of the channels to be restrained thereby;

means for securing said free ends of the body member together with the enlarged end of the cable captured therebetween.

* * * * *